Oct. 20, 1925.
L. W. LESSLER
CAMERA
Filed May 4, 1925.
1,558,100
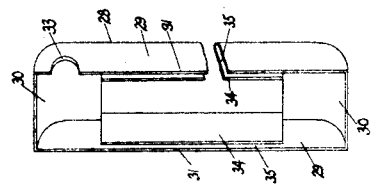
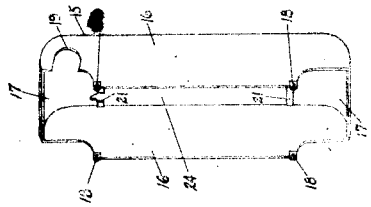
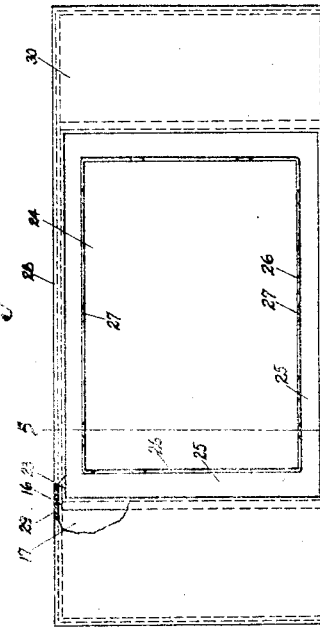
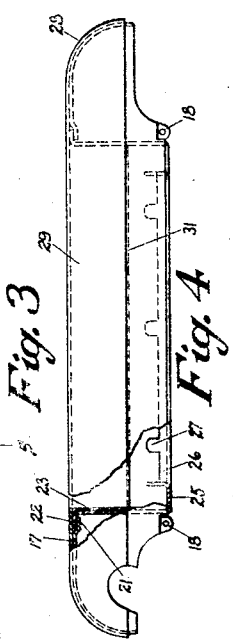
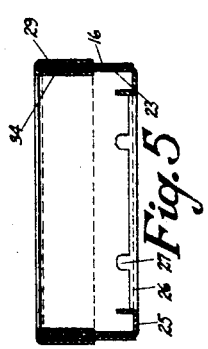
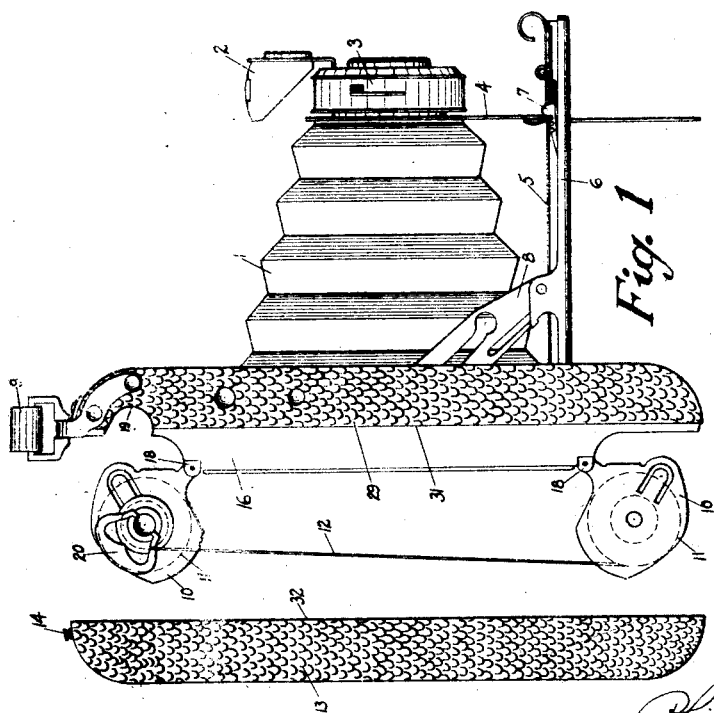
INVENTOR
LEW W. LESSLER
BY
Philip S. Hopkins
ATTORNEY Patented Oct. 20, 1925.

1,558,100

UNITED STATES PATENT OFFICE.

LEW W. LESSLER, OF JOHNSON CITY, NEW YORK, ASSIGNOR TO ANSCO PHOTOPRODUCTS, INC., OF BINGHAMTON, NEW YORK.

CAMERA.

Application filed May 4, 1925. Serial No. 27,795.

*To all whom it may concern:*

Be it known that I, LEW W. LESSLER, a citizen of the United States, and a resident of Johnson City, county of Broome, and State of New York, have invented certain new and useful Improvements in a Camera, of which the following is a description, reference being had to the accompanying drawing, which forms a part of this specification.

This invention relates generally to cameras and particularly to that type known as a folding camera.

The primary object of my invention is to provide a new camera body which when assembled is, by virtue of its construction, light tight, without the use of solder or other material commonly used to fill up cracks, spaces, openings, etc., or otherwise exclude the light.

Another object is to construct this body of few parts which may be readily and easily assembled.

A further object is to provide novel and effective light locks or traps forming part of the camera body.

A still further object lies in the construction of the parts of the body in such manner that they may be readily stamped or otherwise formed from sheet metal thereby eliminating considerable hand work, resulting in a minimum labor cost.

Other objects and advantages in details of construction and operation will be apparent as the description proceeds, reference being had to the accompanying drawing wherein like reference numerals indicate like parts:

In the drawing:—

Figure 1 is a side elevation of a photographic camera of the folding type wherein my invention is embodied. The camera in this figure is shown open and with the back and spool carriages also in open position.

Figure 2 is an exploded view of the three elements which comprise the body portion of my improved camera.

Figure 3 is an outline plan view of the camera body in assembled position.

Figure 4 is a side view of the assembled body, parts being broken away for clearness of illustration.

Figure 5 is a cross section of the assembled body taken on line 5—5 of Figure 3.

In Figure 1, I have illustrated a folding camera provided with the usual bellows 1, view finder 2, shutter 3, and shutter support 4. These elements are adapted to be drawn outwardly from the body of the camera, the support 4 sliding on rails 5 carried by the platform or hinged front 6 of the camera. A focusing device 7 cooperates with the support 4 whereby proper adjustment of the lens and shutter may be had with respect to the object to be photographed. A bracket 8 maintains the platform 6 in its lowered position and permits closing thereof when desired. A handle 9 is provided on top of the camera for convenience in carrying. Swinging carriages 10 are provided to receive the film spools shown in dotted lines at 11, upon which is wound the film 12. These spool carriages are shown in Figure 1, in their outward or loading position, it being understood of course that when the camera is in use they are swung downwardly in the body of the camera and the back 13 is placed thereover and secured in position by any suitable fastening means 14.

All of the above elements are common to this type of camera and form no part of this invention except for clearness in illustration and description.

The body of my improved camera is, as illustrated in Figure 2, composed of three elements or sections. These elements are all adapted to be stamped and formed from sheet metal or other suitable material and are provided with interrelated and cooperating parts designed to prevent light from passing through the body of any of the points to which the various elements are joined or connected. The element 15 comprises the sides 16 and the end pieces 17. These end pieces are preferably integral with the sides 16 and are curved towards the back providing chambers for receiving the spool carriages 10.

The four corners of the sides 16 are provided with pivots 18 upon which the spool carriages 10 are swingingly mounted. One of the sides 16 adjacent one end thereof is cut out as at 19 to receive the hub of the winding key 20 carried by one of the spool carriages.

The inner edges of the end pieces 17 are slightly offset laterally as at 21 forming shouldered seats for receiving the flanges 22 of the element 23 of the body. This element is designed to fit snugly within the opening 24 formed between the ends 17 of the member 15. The sides of the member 23 are substantially of the same width as the sides 16. On the back side of the member 23, the edges thereof are turned inwardly at right angles as at 25 and then downwardly as at 26. The flanges 25 thus formed provide a smooth surface over which the film may travel in its passage through the camera from one spool to the other. The downwardly extending flanges 26 are provided with spaced ears 27 whereby the inner end of the bellows 1 may be secured to the camera in light tight relation. It should be noted also that the flanges 22 cooperating with the shouldered seats 21 form light tight connections between the element 15 and 23.

With the element 23 in position within the member 15, there is still another element to be fitted tightly over a portion of the member 15 and conforming closely to the contour thereof. This element 28 comprises side walls 29 and end pieces 30 adapted to fit snugly over the side walls 16 and end pieces 17 of the member 15. The side walls 29 however are approximately only one-half as deep or wide as the side walls 16. The edges 31 of the former form a rabbet or shoulder seat against which the edges 32 of the back 13 engage when said back is in position upon the body. One of the sides 29 is recessed as at 33 to match the winding key recess 19 in the element 15.

The material of the member 28 between the ends 30 thereof is cut away and a portion thereof is bent downwardly along side of and parallel with the sides 29 thus forming flanges 34. Recesses 35 are thus formed between the flanges 34 and the side pieces 29, said recesses being open at their ends. It will be apparent that when the member 28 is fitted over the member 15 and member 23, the edges of the sides 16 between the end pieces 17, as well as the edges of the sides of the member 23 will be received within these recesses 35 thereby effectively locking all light from admission to the body which otherwise might be admitted through the cracks or crevices commonly formed in assembling a plurality of parts for this purpose.

All of the parts just described fit tightly with one another and are readily assembled. The result is a camera body on which may be readily mounted the various elements required to complete the camera, without danger of light leak through any of the interconnecting elements or parts thereof. This eliminates the necessity common heretofore of using solder or other filling material to close the spaces sometimes left by poorly fitting parts and the absence of proper light locks.

It will be seen that by very simple ingenious method, I have provided safety light blocks or traps in every possible place where light might pass through the camera body either directly or by reflection. The parts are so designed that they may be readily stamped and formed by die and machine operations, and then readily assembled.

It is believed that the operation of my invention and the various parts thereof is clear from the foregoing description and a detailed explanation thereof is not necessary. Suffice it to say that in assembling the body of the camera, the member 23 is merely slipped into position within the member 15, the flanges 22 fitting in the depressions or seats 21, formed in the end pieces 17, and then the element 28 slipped over the member 15, the flanges 34 and sides 29 engaging on either side of the sides 16 and 23. The back 13 being the same size and shape as the member 28, also slips over the member 15 from the opposite side. The edges 32 of said back engaging the edges 31 of the member 28 thus forming a complete light tight camera body.

It will be understood of course that my invention is susceptible to various changes in details of construction and operation without departing from the spirit and scope thereof. I do not limit myself therefore to the exact construction shown other than by the appended claims.

I claim:—

1. A camera body comprising a member provided with sides and end pieces, a second member between said sides and ends, light traps between said second member and said end pieces, and a third member providing light traps between said second member and said sides.

2. A camera body comprising a member provided with sides and end pieces, a second member between said sides and ends, light traps between said second member and said end pieces and a third member having overhanging flanges forming light traps between said second member and said sides.

3. A camera body comprising a member provided with sides and end pieces, a second member between said sides and ends, seats on said end pieces, flanges on said second member fitting in said seats and forming light traps between said second members and said end pieces, and a third member providing light traps between said second member and said sides.

4. A camera body comprising back and a member provided with sides and end pieces, a second member between said sides and ends, seats on said end pieces, flanges on said second member fitting in said seats and forming light traps between said second member and said ends, a third member fitting over said first and second members, provided with overhanging flanges forming light traps between said second member and said sides.

5. A camera body comprising a back and a member provided with sides and end pieces, a second member between said sides and ends, seats on said end pieces, flanges on said second member fitting in said seats and forming light traps between said second member and said ends, a third member fitting over said first and second members, provided with overhanging flanges forming light traps between said second member and said sides, said third member also providing a seat for the back.

6. A camera body comprising a back and a member provided with sides and end pieces, a second member between said sides and ends, seats on said end pieces, flanges on said second member fitting in said seats and forming light traps between said second member and said ends, a third member fitting over said first and second members, provided with over hanging flanges forming light traps between said second member and said sides, the flanges of said third member also providing a seat for the back.

LEW W. LESSLER.